United States Patent [19]

Miyagawa et al.

[11] Patent Number: 4,525,670

[45] Date of Patent: Jun. 25, 1985

[54] GENERATOR FOR GENERATING A ROTATIONAL SIGNAL IN ACCORDANCE WITH CHANGING SATURATION MAGNETIC FLUX DENSITY OF A MAGNETIC MEMBER

[75] Inventors: Seiichi Miyagawa; Takeshi Nakane, both of Kariya, Japan

[73] Assignee: Aisin Seiki Kabushiki Kaisha, Kariya, Japan

[21] Appl. No.: 399,145

[22] Filed: Jul. 16, 1982

[30] Foreign Application Priority Data

Jul. 17, 1981 [JP] Japan ................................ 56-112550
Dec. 2, 1981 [JP] Japan ................................ 56-194198

[51] Int. Cl.³ ............................ G01B 7/14; G01P 3/48
[52] U.S. Cl. ..................................... 324/208; 324/174; 310/168
[58] Field of Search ............... 324/207, 208, 173, 174; 340/870.33; 310/156, 168, 171

[56] References Cited

U.S. PATENT DOCUMENTS 3,293,636 12/1966 Dunne ............................ 324/174 X
4,380,928 4/1983 Iwasaki ........................... 324/208 X Primary Examiner—Gerard R. Strecker
Assistant Examiner—Walter E. Snow
Attorney, Agent, or Firm—Sughrue, Mion, Zinn, Macpeak & Seas

[57] ABSTRACT

A magnetic member preferably comprising an amorphous metal material is mounted adjacent a rotatable member carrying at least one permanent magnet having N and S poles alternating around its circumference. The alignment of N and S poles with opposite end portions of the amorphous metal will decrease the saturation magnetic flux density of the amorphous metal to thereby alter the impedance of at least one electrical coil surrounding the amorphous material. The impedance of the amorphous material will thus modulate during rotation of the rotatable member at a frequency proportional to the frequency of rotation.

6 Claims, 21 Drawing Figures

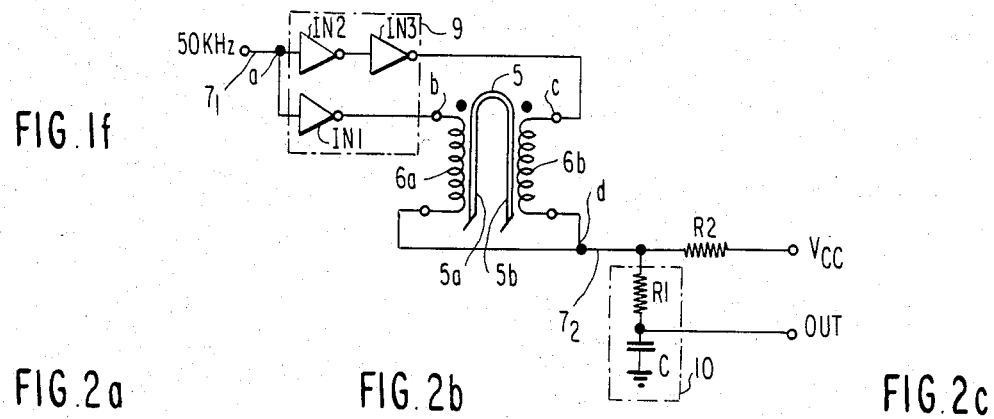
FIG. 1f
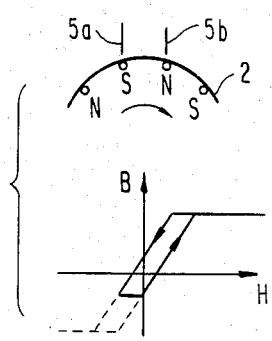
FIG. 2a
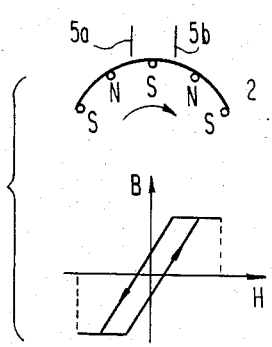
FIG. 2b
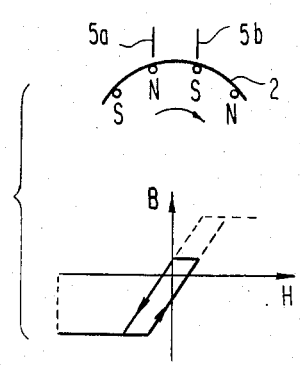
FIG. 2c
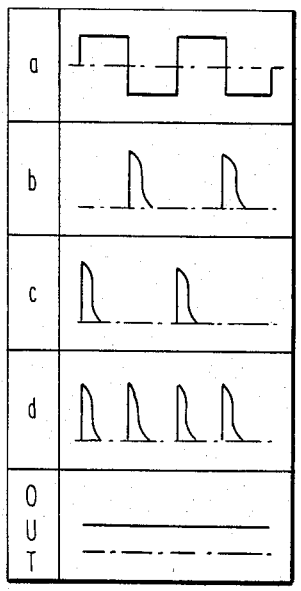
FIG. 3a
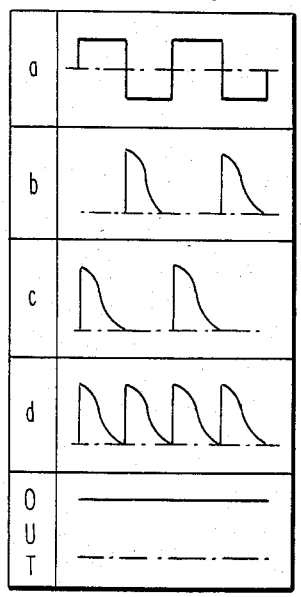
FIG. 3b
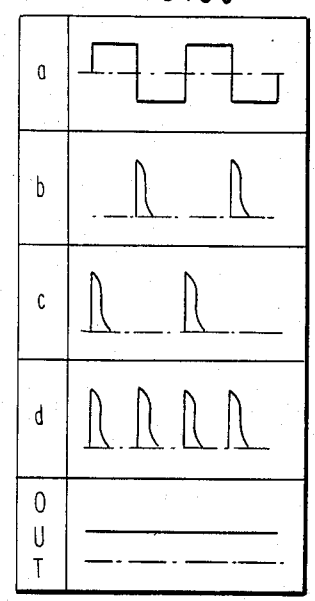
FIG. 3c
FIG. 4
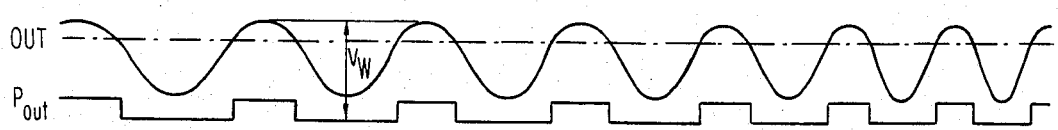

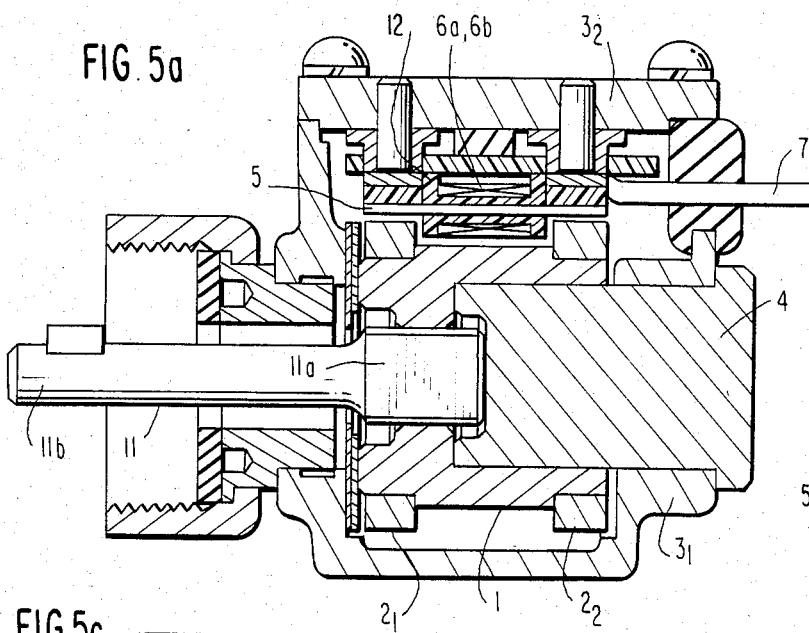
FIG.5a
FIG.5b
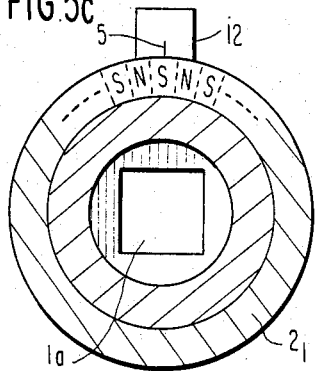
FIG.5c
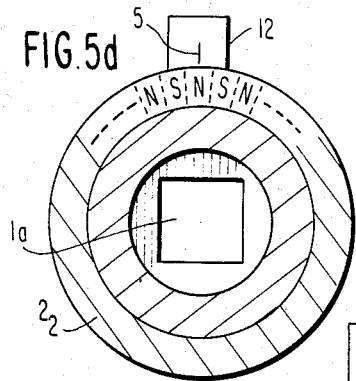
FIG.5d
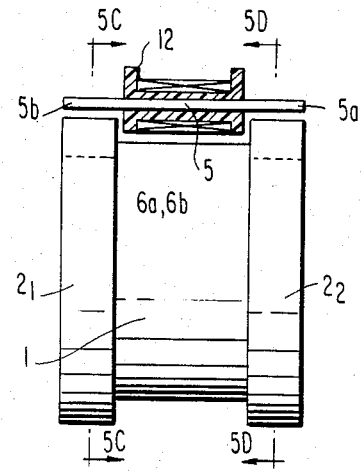
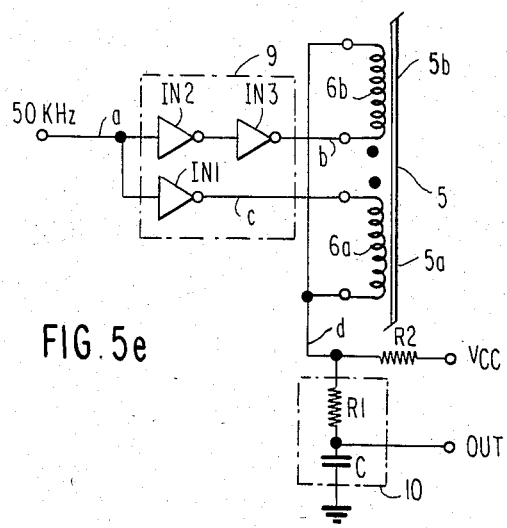
FIG.5e
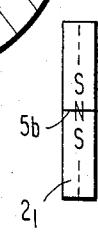 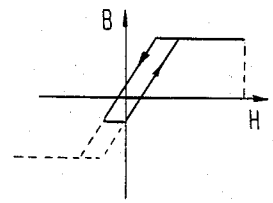
FIG.6a
FIG.6b
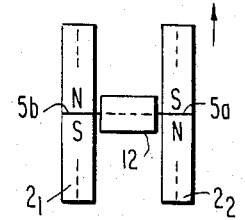 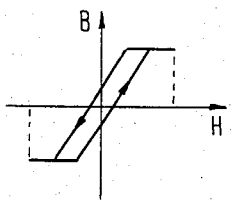
FIG.6c
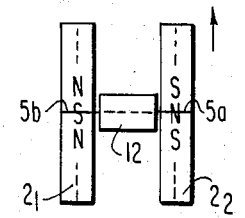

GENERATOR FOR GENERATING A ROTATIONAL SIGNAL IN ACCORDANCE WITH CHANGING SATURATION MAGNETIC FLUX DENSITY OF A MAGNETIC MEMBER

BACKGROUND OF THE INVENTION

The present invention relates to a generator for generating a rotation signal and, more particularly, to improvements in an electrical signal generator of the type which generates a rotation signal in accordance with a change in the intensity of a magnetic field with rotation of a rotator having at least one permanent magnet.

DESCRIPTION OF THE PRIOR ART

One conventional generator includes a reed switch having a contact which is switched by a change in the intensity of a magnetic field of a permanent magnet in accordance with rotation of a rotator carrying the permanent magnet, thereby generating a rotation detection signal. This arrangement is unsatisfactory, however, in that the durability of contact of the reed switch is low. Another conventional generator includes a pick-up coil having an induced voltage which changes in accordance with change in the intensity of the magnetic field of a permanent magnet due to rotation of a rotator carrying the permanent magnet, thereby generating a rotation detecting signal. This arrangement is also unsatisfactory, however, in that the responsiveness is low in the low range of rotational speed of the rotator because the induced voltage becomes low at low speeds of the rotator.

SUMMARY OF THE INVENTION

An object of the present invention is, therefore, to provide an improved generator for generating a rotation signal which overcomes the disadvantages in the conventional generators.

Another object of the present invention is to provide an improved generator for generating a rotation signal which easily and accurately converts into pulses synchronized with rotation of the rotator even when the rotational speed of rotator is low.

According to the present invention, a change in the magnetic flux of a magnetic substance, which change is caused by rotation of a rotator having a permanent magnet, is converted into a change of impedance in an electrical coil and a voltage corresponding to the change of impedance in the electrical coil is sensed to generate a rotation signal. As a result, the present invention is highly durable because the moving portion is only the rotator having the permanent magnet, and the sensed voltage will be a sine wave of constant amplitude even when the rotational speed changes, because the impedance in the electrical coil changes in accordance with rotational position of the rotator but is not affected by the rotational speed of the rotator. In the preferred embodiment, a magnetically soft amorphous metal is used as the magnetic substance. It is shaped into a thin sheet since it must be quenched from liquid metal. The amorphous metal substance is ferromagnetic and exhibits a high magnetic permeability and a high magnetic saturation as well as a low coercive force. Mechanically, it has a very high fracture strength and an excellent resiliency and stability.

These characteristics of the amorphous member are very advantageous for use in the generator because it may thus be easily saturated by the magnetic flux of the permanent magnet installed in the rotator, and a change in the inductance of an electrical coil wound on the amorphous magnetic substance may be easily produced in accordance with rotation of the rotator. In its mechanical aspects, the amorphous member facilitates the manufacture of the generator and improves its immunity to vibration and shock.

Other objects and features of the invention will become apparent from the following description of the preferred embodiments thereof with reference to the drawings.

BRIEF DESCRIPTION OF THE DRAWINGS

FIG. 1b is a sectional view of FIG. 1a along the line IB—IB shown in FIG. 1a;

FIG. 1c is a sectional view of FIG. 1a along the line IC—IC shown in FIG. 1a;

FIG. 1d is a sectional view of FIG. 1a along the line ID—ID shown in FIG. 1a;

FIG. 1e is a bottom view of the generator shown in FIG. 1a;

FIG. 1f is a circuit diagram of an electrical processing circuit being connected with two electrical coils 6a and 6b;

FIG. 2a, FIG. 2b and FIG. 2c are views showing the relationship between the rotational angle of permanent magnet 2 and the positions of legs 5a, 5b of an amorphous magnetic substance, and the magnetization characteristics of the amorphous magnetic substance in the above-mentioned relationship in the generator shown in FIG. 1a.

FIG. 3a, FIG. 3b and FIG. 3c illustrate the waveforms of voltages at each point of the electrical processing circuit under the conditions shown in FIG. 2a, FIG. 2b and FIG. 2c, respectively;

FIG. 4 illustrates the output OUT of the electrical processing circuit and a corresponding binary coded pulse $P_{out}$, when the rotator is rotating;

FIG. 5a is a vertical transverse sectional view of a generator for generating a rotation signal according to another embodiment of the invention;

FIG. 5b is a front view of a rotator 1, amorphous magnetic substance 5 and electrical coils 6a and 6b of FIG. 5a;

FIG. 5c is a sectional view of FIG. 5b along the line 5C—5C shown in FIG. 5b;

FIG. 5d is a sectional view of FIG. 5b along the line 5D—5D shown in FIG. 5b;

FIG. 5e is a circuit diagram of an electrical processing circuit applied to the generator of FIG. 5d; and FIG. 6a, FIG. 6b and FIG. 6c are drawings showing the relationship between the rotational angles of permanent magnets $2_1$, $2_2$ and the positions of the amorphous magnetic substance 5, and the magnetization characteristics of the amorphous magnetic substance in the above-mentioned relationship, in the generator shown in FIG. 5a.

DETAILED DESCRIPTION OF THE INVENTION

Figure 1A:
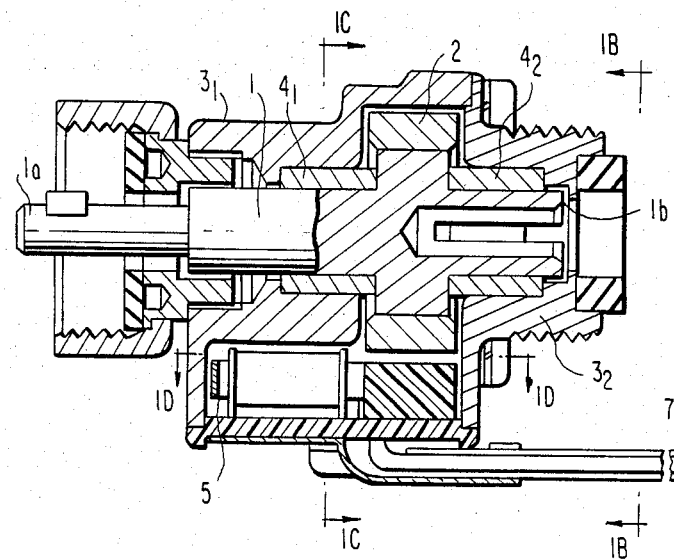
FIG. 1a is a vertical transverse sectional view of a generator for generating a rotation signal according to one embodiment of the invention.
Figure 1B:
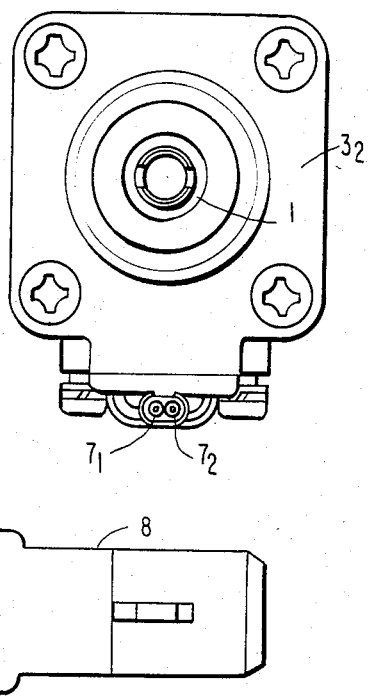
Figure 1C:
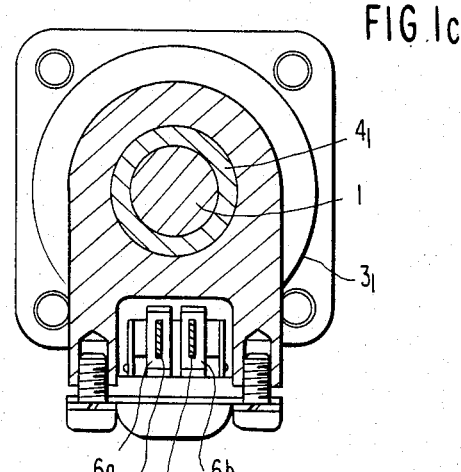
Figure 1D:
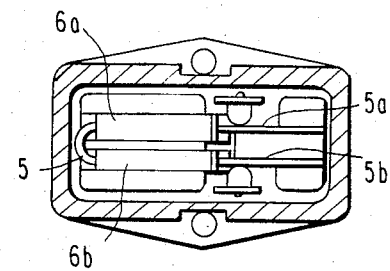
Figure 1E:
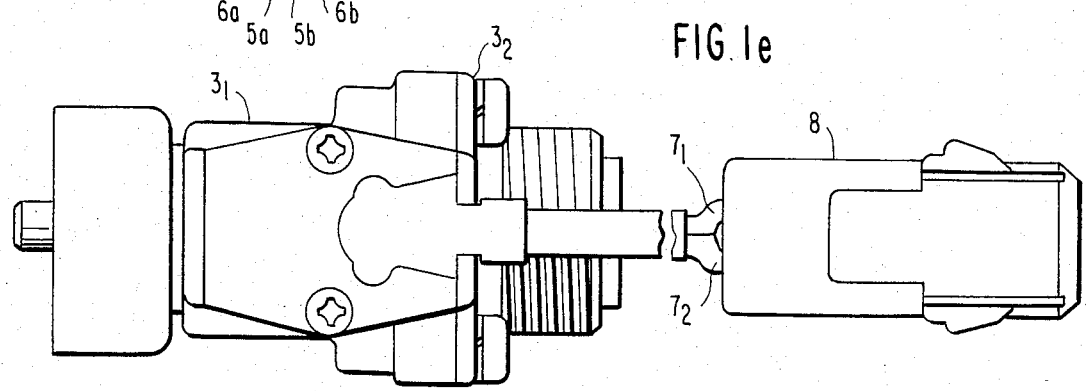

FIGS. 1a to 1f illustrate one embodiment of the generator according to the invention. An annular permanent magnet 2 is fixed to a rotator 1. An outer peripheral portion of magnet 2 is polarized and magnetized into twelve poles wherein six S magnetic poles and six N magnetic poles are arrayed alternately in a circumferential direction thereof. The rotator 1 is mounted on bearings $4_1$ and $4_2$ which are pressed into casings $3_1$ and $3_2$, respectively. The rotator 1 has a desirable shape wherein one end thereof connects with a transmission output shaft and the other end thereof connects with a speedometer cable so that the generator may be used as a vehicle speed sensor. An amorphous magnetic substance 5 which is bent into a U-shape from its normal condition is installed near a peripheral surface of the permanent magnet 2. The space between a leg 5a and a leg 5b of the amorphous magnetic substance 5 should be made equal to the space between adjacent N and S magnetic poles of the permanent magnet 2. Around the legs 5a and 5b are wound electrical coils 6a and 6b, respectively, of two hundred turns each. The coils 6a and 6b are electrically connected to a connector 8 through respective lead wires $7_1$ and $7_2$.

In FIG. 1f, a switching circuit 9 has an inverting amplifier IN1 of the open-collector type serially connected to one end of coil 6a, and inverting amplifiers IN2 and IN3 of the open-collector type serially connected to one end of coil 6b. The other ends of coils 6a and 6b are connected to each other, and the common connection is further connected to the Vcc line of a regulated supply voltage through a resistor $R_2$ and a smoothing circuit 10 having a resistor $R_1$ and a capacitor c.

In this embodiment, input pulses having a frequency on the order of 50 kHz and a duty cycle ratio on the order of 50 percent, for example, are applied to the inverting amplifiers IN1 and IN2. In the period of a high level "1" in the input pulse, the inverting amplifier IN1 is turned on whereby one end of coil 6a is grounded, but the inverting amplifier IN3 is turned off by operation of the inverting amplifier IN2, and one end of coil 6b is left floating. Consequently, in the period of a high level "1" input pulse, current flows through the coil 6a but does not flow through the coil 6b, but during a low level "0" input pulse, current does not flow through the coil 6a but flows instead through the coil 6b. As a result, the coils 6a and coil 6b are turned on alternately.

The coils 6a and 6b have a high impedance until the flux applied thereto reaches a saturated magnetic flux density, but have a low impedance when the applied flux exceeds the saturated magnetic flux density thereof. As shown in FIG. 2a and FIG. 2c, when the magnetic poles of magnet 2 are positioned directly below the legs 5a and 5b of amorphous magnetic substance 5, the amorphous magnetic substance 5 may be easily saturated by electrically charging the coils 5a and 5b, whereby the impedance of each coil 6a and 6b becomes low. On the other hand, as shown in FIG. 2b, when the magnetic poles of magnet 2 are positioned between the leg 5a and the leg 5b, the amorphous magnetic substance 5 may not be easily saturated, whereby the impedance of coils 6a and 6b becomes high. When the coil has a high impedance, a voltage drop therein is large whereby the voltage applied to the smoothing circuit 10 is high, but when the coil has a low impedance, the voltage drop therein is small whereby the voltage applied to the smoothing circuit 10 is low.

The voltage at various points in the electrical processing circuit shown in FIG. 1f are changed by the rotation of rotator 1 as shown in FIGS. 3a to 3c. FIG. 3a shows the voltage waveforms under the conditions shown in FIG. 2a, FIG. 3b shows the voltage waveforms under the conditions shown in FIG. 2b, and FIG. 3c shows the voltage waveforms under the conditions shown in FIG. 2c. As a result, the output OUT of the electrical processing circuit fluctuates sinusoidally as shown in FIG. 4 in accordance with rotation of the rotator 1, and the frequency of the sinusoidal variation is proportional to the rotational speed of rotator 1 with a ratio determined by the number of alternating magnetic poles. The amplitude $V_w$ of the sine wave is constant in both high speed and low speed ranges. The output OUT is converted to a pulse $P_{out}$ which is binary with a threshold level shown by the two-dot chain line shown in FIG. 4, and the pulse output $P_{out}$ has a frequency corresponding to the rotational speed of rotator 1, this frequency also being proportional to the rotational speed with a ratio determined by the number of alternating poles carried by the rotator 1.

Another embodiment according to this invention is shown in FIG. 5a to FIG. 5e and FIG. 6a to FIG. 6c. In this second embodiment, there is no necessity to bend the magnetic substance from its normal condition. This results in a lower permeability of the magnetic substance, whereby the magnetic substance is capable of reaching magnetic saturation even though in a low magnetic field, and the number of magnetic poles of the permanent magnet in the rotator may be increased. As a result, the number of resulting signals per one revolution of the rotator may be increased, whereby the generator is capable of indicating rotational position or speed with a high resolution. This second embodiment is desirable for use with a digital speedometer wherein at least forty pulses are required per one revolution of the rotator because the indication of the speedometer has to be changed every 1 kilometer/hr of speed.

In FIGS. 5a to 5d, circular permanent magnets $2_1$ and $2_2$ are fixed to either end of a rotator 1 of magnetic material. Each outer peripheral portion of magnets $2_1$ and $2_2$ has forty magnetic poles with twenty N poles and twenty S poles being alternately arrayed along the circumferential direction thereof. The magnets $2_1$ and $2_2$ are offset in the axial direction of rotator 1 and their poles are arranged so that each N pole in one magnet confronts a S pole in the other magnet. The permanent magnets $2_1$ and $2_2$ are both ferrite magnets.

The rotator 1 is rotatably mounted on a bearing 4 pressed into a casing $3_1$. A shaft 11 for transmitting a rotational power applied from its outer end to the rotator 1 has a square cross-sectional shape at its inner end 11a so as to fit into a hole 1a of rotator 1. The shaft also has a desirable shape at the other end thereof so as to be connected to an output shaft from the transmission so that the generator according to this embodiment may be used as a vehicle speed sensor. A thin amorphous magnetic metal 5 in the shape of a straight line is installed near the peripheral surface of rotator 1 so that both ends thereof confront with the permanent magnets $2_1$ and $2_2$ in the axial direction thereof. When one end 5a of the amorphous magnetic substance 5 confronts the N pole of permanent magnet $2_2$, the other end 5b confronts the S pole of permanent magnet $2_1$ as shown in FIG. 5c and FIG. 5d. Alternately, if the one end 5a of amorphous magnetic substance 5 confronts the S pole of permanent magnet 22 after rotation of rotator 1, the other end 5b would confront the N pole of permanent magnet $2_1$.

Electrical coils 6a and 6b are wound on a bobbin 12 with two hundred turns each, and the bobbin 12 is fixed to a casing 32. The electrical coils 6a and 6b are connected to a connector 8 through lead wire 7. The connecting relationship of the components of the electrical processing circuit according to this embodiment shown in FIG. 5e is similar to that of the electrical processing circuit shown in FIG. 1f.

As shown in FIG. 6a and FIG. 6c, when the poles of the permanent magnets $2_1$ and $2_2$ are positioned directly below the ends of the amorphous magnetic substance 5, the amorphous magnetic substance 5 may be easily magnetically saturated by applying an electric current to the coils 6a and 6b whereby the impedance of each coil 6a and 6b becomes low. On the other hand, as shown in FIG. 6b, when the ends 5b and 5a are positioned between the poles of magnets $2_1$ and $2_2$, respectively, the amorphous magnetic substance 5 may not be easily saturated, whereby the impedance of each of coils 6a and 6b becomes high. As a result, the voltages at each of points a, b, c, d and OUT of the electrical processing circuit shown in FIG. 5e change in a manner similar to the voltages shown in FIGS. 3a to 3c. More particularly, each voltage waveform under the conditions shown in FIG. 5a, FIG. 5b and FIG. 5c is similar to the waveform in each of FIG. 3a, FIG. 3b and FIG. 3c, respectively. Consequently, in this embodiment, an output OUT of the electrical processing circuit and a pulse $P_{out}$ may be obtained which are similar to the output OUT and the pulse Pout as shown in FIG. 4. In one experiment, the generator of the second embodiment generated forty pulses per revolution of the rotator.

In the description of this second embodiment, the magnetic substance is of a straight line shape, but a magnetic substance which is bent may also be used if no stress is applied thereto. Further, not only the amorphous magnetic substance but also, for example, a permalloy may be used as the magnetic substance.

What is claimed is:

1. A generator for generating a rotation signal, comprising:
   a magnetic member (5) having first and second portions;
   a rotatable member (1) including at least one permanent magnet (2, 21 or 22) having at least one N pole and at least one S pole displaced circumferentially around said rotatable member, said N and S poles and said magnetic member being relatively spaced such that said N pole is adjacent said first portion when said S pole is adjacent said second portion; and
   detection means for providing said rotation signal in accordance with changes in the saturation magnetic flux density of said magnetic member, said detection means comprising first and second electrical coil portions each adjacent a respective one of said first and second magnetic member portions, and an electrical processing circuit for applying intermittent pulse signals to said electrical coil portions which are out-of-phase with respect to one another, said electrical processing circuit comprising switching means (9) for alternately applying said pulse signals to one and then the other of said first and second coil portions, and a smoothing circuit (10) connected in parallel with each of said first and second coil portions and providing said rotation signal output.

2. A rotation signal as claimed in claim 1, wherein said detection means provides said rotation signal in accordance with the impedances of said electrical coil portions.

3. A rotation signal generator as claimed in claim 1, wherein said magnetic member comprises an amorphous metal material.

4. A rotation signal generator as claimed in claim 1, wherein said at least one permanent magnet having at least one N pole and at least one S pole comprises a plurality of N and S poles alternately arranged in a single circumferential line, with said first and second portions of said magnetic member each being simultaneously adjacent a different one of said poles in said single circumferential line.

5. A rotation signal generator as claimed in claim 1, wherein said at least one permanent magnet having at least one N pole and at least one S pole comprises a first permanent magnet member having N and S poles alternately arranged in a first circumferential line and a second permanent magnet member having N and S poles alternately arranged along a second circumferential line, said first and second circumferential lines being displaced with respect to one another along a rotational axis of said rotatable member, said first portion of said magnetic member being adjacent an N pole of said first permanent magnet member whenever said second portion of said magnetic member is adjacent an S pole of said second permanent magnet member.

6. A rotation signal generator as claimed in claim 5, wherein said magnetic member follows a substantially straight path between said first and second portions.

* * * * *